(12) United States Patent
Lentz et al.

(10) Patent No.: US 6,438,971 B1
(45) Date of Patent: Aug. 27, 2002

(54) SYSTEM AND METHOD FOR CONTROLLING AN ULTRAVIOLET AIR TREATMENT DEVICE FOR AIR CONDITIONER COOLING COIL IRRADIATION APPLICATIONS

(75) Inventors: Tracy L. Lentz; Timothy J. Kensok, both of Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/995,049

(22) Filed: Nov. 26, 2001

(51) Int. Cl.[7] .................................................. F24F 3/16
(52) U.S. Cl. ........................................... 62/78; 62/264
(58) Field of Search ...................................... 62/78, 264

(56) References Cited

U.S. PATENT DOCUMENTS

| | | | |
|---|---|---|---|
| 5,107,687 A | | 4/1992 | Candeloro |
| 5,200,156 A | | 4/1993 | Wedekamp |
| 5,225,167 A | | 7/1993 | Wetzel |
| 5,601,619 A | * | 2/1997 | Drechsler .................... 607/88 |
| 5,635,133 A | | 6/1997 | Glazman |
| 5,742,063 A | | 4/1998 | Scroggins et al. |
| 5,755,103 A | * | 5/1998 | Na et al. ........................ 62/78 |
| 5,884,500 A | * | 3/1999 | Wetzel ...................... 62/259.1 |
| 5,935,525 A | | 8/1999 | Lincoln et al. |
| 5,968,455 A | | 10/1999 | Brickley |
| 6,022,511 A | | 2/2000 | Matschke |
| 6,063,170 A | | 5/2000 | Deibert |
| 6,264,802 B1 | | 7/2001 | Kamrukov et al. |
| 6,280,686 B1 | * | 8/2001 | Scheir et al. .................. 422/24 |
| 6,313,470 B1 | * | 11/2001 | Fencl et al. ............ 250/454.11 |
| 2001/0025570 A1 | * | 10/2001 | Fukushima ..................... 95/57 |

OTHER PUBLICATIONS

Honeywell Brochure, "Comfort, Energy & Health Solutions," ©Honeywell 2001.
Owner's Guide, "Enviracaire Elite—UV100E Ultraviolet Air Treatment System," 8 pgs, ©Honeywell 2001.

* cited by examiner

Primary Examiner—William C. Doerrler
Assistant Examiner—Mark Shulman

(57) ABSTRACT

A method of controlling an ultraviolet air treatment device including an ultraviolet lamp positioned to irradiate an air conditioner cooling coil. A controller is connected to the ultraviolet air treatment device to dictate activation and deactivation of the ultraviolet lamp. A first control sequence is performed to automatically cycle the ultraviolet lamp between a powered on condition for a first predetermined time period and a powered off condition for a second predetermined time period. In one preferred embodiment, the method further includes monitoring an operational mode of the air conditioner. A transition routine is initiated upon determining that the operational mode has switched from cooling to non-cooling, and the ultraviolet lamp is controlled in accordance with a second control sequence if the air conditioner remains in the non-cooling mode throughout an entirety of the transition routine.

29 Claims, 4 Drawing Sheets

SYSTEM AND METHOD FOR CONTROLLING AN ULTRAVIOLET AIR TREATMENT DEVICE FOR AIR CONDITIONER COOLING COIL IRRADIATION APPLICATIONS

BACKGROUND OF THE INVENTION

The present invention relates to a system and method for controlling operation of ultraviolet lamps. More particularly, it relates to a system and method that efficiently operates an ultraviolet lamp otherwise serving to reduce or eliminate microorganisms propagating on an air conditioner cooling coil(s) of an air handling system.

Though invisible to the naked eye, a multitude of airborne germs (e.g., bacteria, mold spores, etc.) exist, many of which have adverse implications for humans. The likelihood of inhaling or contacting one or more of these microorganisms is elevated in enclosed areas, such as a home, office, etc. In most residential and commercial environments, an air handling system is in place, whereby outdoor air may be drawn into the home or building via a fresh air intake that merges with a return air duct, and then is subjected to heating or cooling conditions within the air handling system (e.g., via a furnace, air conditioner, etc.). The heated or cooled air is then forced through auxiliary ductwork back to the rooms or offices. Thus, airborne germs entrained in the incoming and return airflow are effectively "concentrated" within the air handling system.

Efforts have been made to remove airborne contaminants from the intake (or return) air with filters, ultraviolet lamps, etc., that are fluidly connected to and/or positioned within the return air duct. Unfortunately, these techniques do not address an additional source of unwanted microorganisms. In particular, most air handling systems include one or more air conditioners. In general terms, the air conditioner includes a condenser unit and one or more cooling or evaporator coils. During use, the condenser cycles an appropriate refrigerant through the cooling coils that are positioned within a supply duct of the air handling system. Air is forced about or through the cooling coils. Heat is transferred from the air to the refrigerant, thereby cooling the air. As the refrigerant is heated, condensation along an exterior of the cooling coils occurs. This moist environment is an ideal breeding ground for microorganisms, especially mold spores. If left untreated, the microorganisms become entrained within the airflow and are subsequently directed to the room(s) or office(s) otherwise serviced by the air handling system, possibly leading to the health concerns highlighted above.

A highly viable solution to the above-described cooling coil related microorganism issue is to irradiate the cooling coil with ultraviolet energy or light. Studies have found that ultraviolet irradiation effectively eliminates most of the problematic microorganisms commonly generated on residential and commercial central air conditioner cooling coils. In general terms, an ultraviolet air treatment device useful for cooling coil applications includes one or more appropriately sized ultraviolet lamps that are positioned within the air handling system's ductwork, in close proximity to the cooling coil. The ultraviolet lamp is normally mercury-based, with the ultraviolet air treatment device including a power supply ballast used to energize the mercury. One example of an acceptable ultraviolet air treatment device is available under the trade name "Enviracaire Elite UV 100E Ultraviolet Air Treatment System" from Honeywell Inc., of Golden Valley, Minn.

Efforts have been made to improve the life and operational characteristics associated with ultraviolet air treatment lamps. For example, non-ozone producing lamps are now available. However, the method of controlling operation of the ultraviolet air treatment device for cooling coil irradiation applications has essentially remained unchanged. In particular, the ultraviolet lamp(s) is simply powered on following installation, and is never shut off. Regardless of whether the air conditioner is active or inactive, the ultraviolet lamp(s) stays on twenty-four hours a day. While viable, this approach is quite inefficient in that when the air conditioner is inactive for extended periods of time, there is (and has been) no condensation forming on the cooling coil, and thus no "new" microorganisms (e.g., mold spores) being generated, so that powering of the ultraviolet lamp is of limited value. As a result, continuous powering of the ultraviolet lamp needlessly consumes a relatively substantial portion of the lamp's useful life, thereby requiring more frequent lamp replacement (and thus increased maintenance costs) and excess energy consumption. Alternatively, the user may be instructed to manually turn the ultraviolet lamp off when it is expected that the air conditioner will not be used (e.g., winter season), and then turn the ultraviolet lamp on when air conditioner use is expected (e.g., summer season). Obviously, a user may forget to perform these activities, resulting in inefficient ultraviolet lamp operation when the air conditioner is not in use and/or failure to use the ultraviolet lamp when removal of cooling coil-generated microorganisms is necessary. Similarly, the user may incorrectly decide that the air conditioner will not be in use, or vice-versa.

Ultraviolet air treatment devices continue to be highly popular for removal of airborne germs. In fact, ultraviolet air treatment devices are now being advocated for treating or irradiating air conditioner cooling coils. Unfortunately, the currently employed technique for operating an ultraviolet air treatment device in a cooling coil environment overtly decreases a useful life of the ultraviolet lamp and, where a user is required to estimate appropriate usage, may not be turned on when needed. Therefore, a need exists for a system and method for efficiently controlling an ultraviolet air treatment device used to irradiate microorganisms occurring on an air conditioner cooling coil of an air handling system.

SUMMARY OF THE INVENTION

One aspect of the present invention relates to a method of controlling operation of an ultraviolet air treatment device including an ultraviolet lamp positioned to irradiate an air conditioner cooling coil associated with an air handling system. The method includes electrically connecting a controller to the ultraviolet air treatment device such that the controller can dictate activation and deactivation of the ultraviolet lamp. A first control sequence is then performed whereby the controller automatically cycles the ultraviolet lamp between a powered on condition for a first predetermined time period and a powered off condition for a second predetermined time period. In this regard, the ultraviolet lamp irradiates the cooling coil in the powered on condition. In one preferred embodiment, the first and second predetermined time periods are both three hours. In another preferred embodiment, the method further includes monitoring an operational mode of the air conditioner (with the air conditioner operating in either a cooling mode or a non-cooling mode). Further, a transition routine is initiated upon determining that the operational mode has switched from cooling to non-cooling. In this regard, the transition routine includes controlling operation of the ultraviolet lamp in accordance with the first control sequence as identified above for a predetermined length of time. In an even more preferred embodiment, the transition routine extends for thirty days, with the method further including operating the ultraviolet lamp in accordance with a second control sequence if the air conditioner remains in the non-cooling mode throughout an entirety of the thirty-day transition period.

Another aspect of the present invention relates to a control system for controlling operation of an ultraviolet air treatment device. In this regard, the ultraviolet air treatment device includes an ultraviolet lamp positioned to irradiate an air conditioner cooling coil associated with an air handling system. With this in mind, the control system includes an activation device and a controller. The activation device is electrically connected to the ultraviolet lamp for selectively powering the ultraviolet lamp on and off. The controller is electrically connected to the activation device and is adapted to store a first and second predetermined time period. Further, the controller is adapted to perform a first control sequence in which the controller automatically cycles the ultraviolet lamp between a powered on condition for the first predetermined time period and a powered off condition for the second predetermined time period. In one preferred embodiment, the control system further includes a temperature sensor electrically connected to the controller and positioned within the air handling system for providing temperature information indicative of an operational mode of the air conditioner. With this one preferred embodiment, the controller is adapted to determine the operational mode of the air conditioner based upon the temperature information.

DESCRIPTION OF THE PREFERRED EMBODIMENTS

Figure 1:
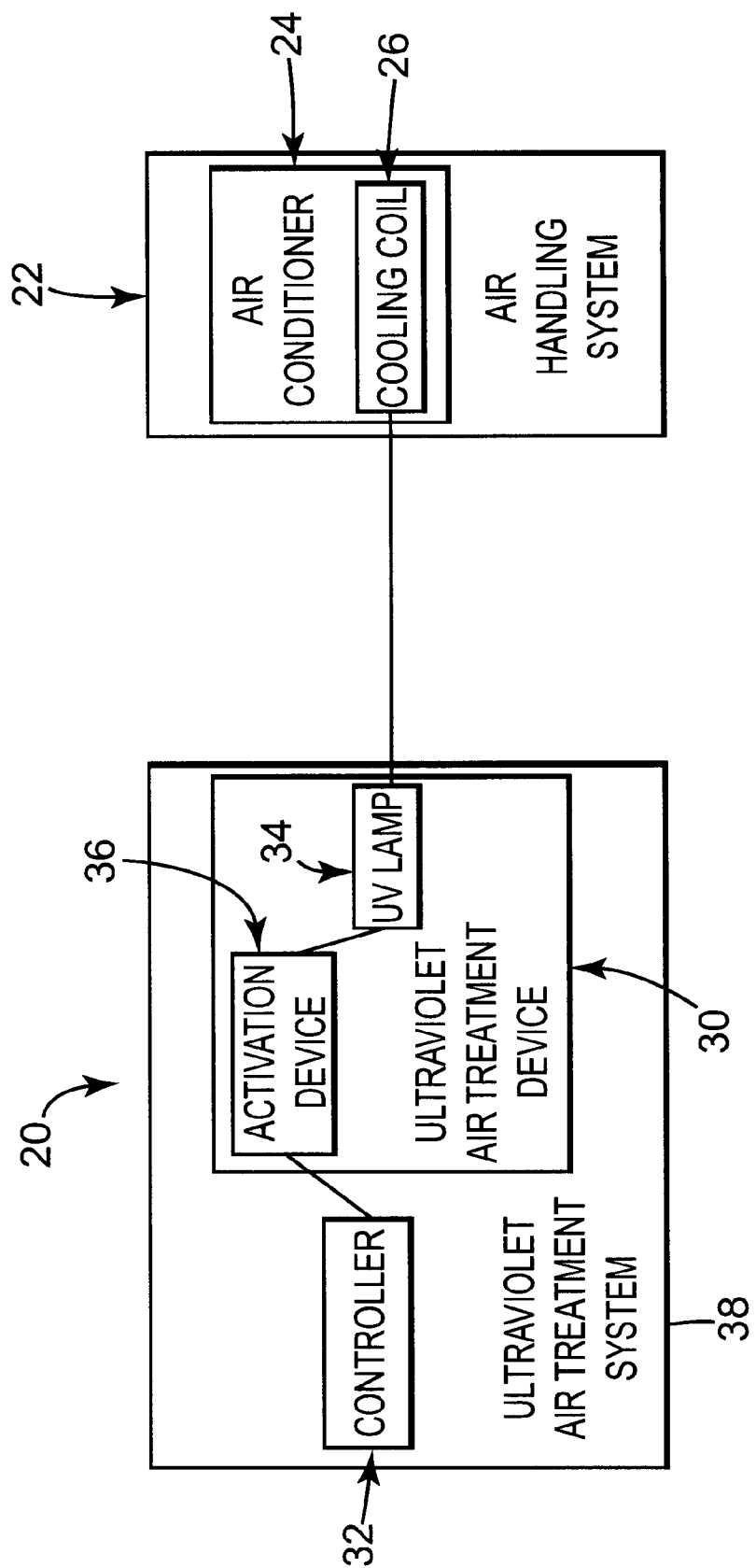
FIG. 1 is a block diagram illustrating an ultraviolet air treatment system in accordance with the present invention in conjunction with an air handling system including an air conditioner.

One preferred embodiment of an ultraviolet air treatment system 20 is shown in block form in FIG. 1, in conjunction with an air handling system 22. As a point of reference, the air handling system 22 can assume a wide variety of forms appropriate for a particular residential, commercial, or industrial application. Thus, the air handling system 22 can include various air handling components (not shown), such as heating systems (e.g., furnace, heat pump, electric heat, etc.), humidifiers, ductwork, filters, etc. Further, the air handling system 22 can be constructed to direct heated, cooled and/or filtered air to a number of separate rooms, or can be installed to a single room. Regardless, the air handling system 22 includes an air conditioner 24. The air conditioner 24 can assume a wide variety of forms known in the art (e.g., split-system, chilled-water system, cooling tower, swamp cooler), and generally includes an evaporator or cooling coil 26 about which return air is blown by a fan/blower (or other similar device) associated with the air handling system 22. In this regard, the air conditioner 24 can be defined as operating in either a "cooling mode" or a "non-cooling mode". In the cooling mode, the air conditioner 24 operates to direct refrigerant through the cooling coil 26, thereby conditioning air within the air handling system 22. Conversely, in the non-cooling mode, refrigerant is not actively cycled through the cooling coil 26. Of course, in the non-cooling mode, the air handling system 22 can still be operating in an "on state" by which air is being forced through the ductwork (such as during a heating operation).

With the above in mind, the ultraviolet air treatment system 20 is configured for treating or irradiating the cooling coil 26, and includes an ultraviolet air treatment device 30 and a controller 32. The components are described in greater detail below. In general terms, however, the ultraviolet air treatment device 30 includes an ultraviolet lamp 34 and an activation device 36. The ultraviolet lamp 34 is adapted to protrude within a duct (not shown) of the area link system 22 otherwise enclosing the cooling coil 26. More particularly, the ultraviolet lamp 34 is positioned in close proximity to the cooling coil 26 such that, when activated by the activation device 36, the ultraviolet lamp 34 treats or irradiates the cooling coil 26 with ultraviolet energy. In this regard, the controller 32 is electrically connected to the activation device 36, and thus controls the ultraviolet lamp 34 pursuant to control methodologies described in greater detail below.

Ultraviolet air treatment devices are well known in the art, such that the ultraviolet air treatment device 30 can assume a variety of forms. One acceptable ultraviolet air treatment device is available under the trade name "Enviracaire Elite, UV100E Ultraviolet Air Treatment System-Coil Irradiation Unit" from Honeywell Inc., of Golden Valley, Minn. In general terms, the ultraviolet air treatment device 30 includes a housing 38 (reference generally in FIG. 1) that maintains the ultraviolet lamp 34 and the activation device 36. Further, the housing 38 is adapted for mounting to a duct (not shown) of the air handling system 22 that otherwise encloses the cooling coil 26. The ultraviolet lamp 34 can likewise assume a variety of forms, but is preferably a low-pressure mercury lamp (e.g., mercury sealed within a protective structure). With this design, the activation device 36 preferably includes a ballast (magnetic or electronic) adapted to selectively power on and off the ultraviolet lamp 34. Alternatively, other devices able to directly turn the ultraviolet lamp 34 on and off are equally acceptable.

The controller 32 is electrically connected to the activation device 36 and is preferably a microprocessor based computer including associated memory and associated input/output circuitry. Alternatively, a programmable logic controller (PLC) or other controller or equivalent circuitry can be employed. Further, while the controller 32 is illustrated as being contained within the housing 38, the controller 32 can be a separate component that is otherwise electrically connected to the activation device 36.

The controller 32 is adapted to prompt the activation device 36 to power on or power off the ultraviolet lamp 34 based upon certain constraints as described below. In one preferred embodiment, the controller 32 is adapted to implement a first control sequence whereby the ultraviolet lamp 34 is powered on and powered off for predetermined time periods. To this end, the controller 32 includes a memory that stores these predetermined time period values.

Figure 2:
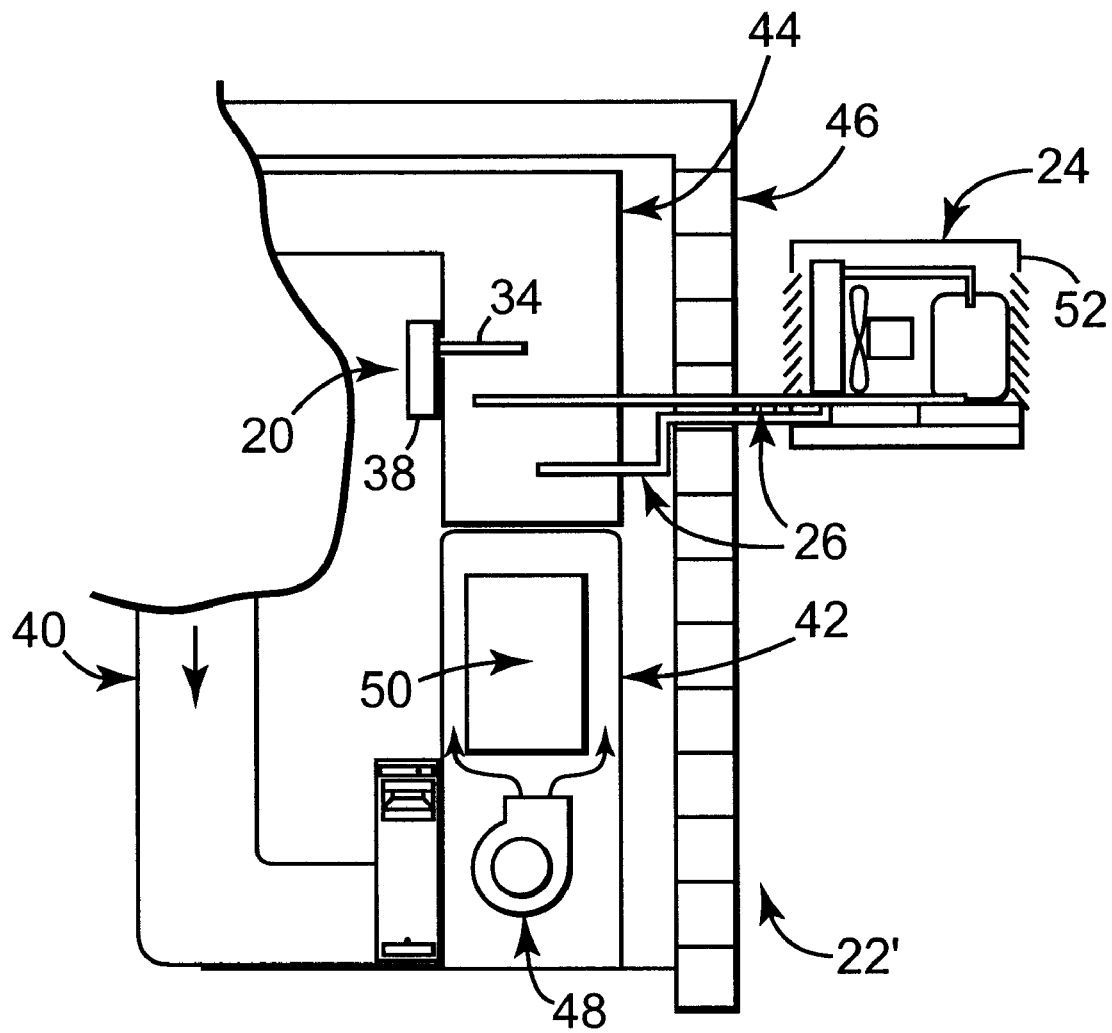
FIG. 2 is a diagrammatical illustration of the ultraviolet air treatment system of FIG. 1 as applied to a residential air handling system.

The above-described ultraviolet air treatment system 20 is illustrated in diagrammatical form in FIG. 2 in conjunction with one example of an air handling system 22' commonly employed for residential applications. With the one embodiment of FIG. 2, the air handling system 22' includes the air conditioner 24 including the cooling coil(s) 26, a return air duct 40, a furnace 42, and a supply duct 44. As previously described, the air handling system 22' can further include additional components (e.g., filter, humidifier, etc). In general terms, however, the air handling system 22' is installed relative to a home (an exterior wall 46 of which is shown in FIG. 2). The furnace 42 is fluidly connected to the return air duct 40 and includes a fan/blower 48 and a heat exchanger 50. The cooling coils 26 are positioned within the air duct 44 downstream of the furnace 42. The air conditioner 24 illustrated in FIG. 2 is a split-system unit as is known in the art, and thus includes a condensing unit 52 that is otherwise positioned outside of the structure (e.g., on the opposite side of the wall 46). During use, the condensing unit 52 forces cooled refrigerant into the cooling coil 26. The fan/blower 48 operates to draw air into the air handling system 22' via the return air duct 40, and then into the furnace 42. During a cooling operation, the heat exchanger 50 is inactive, and the fan/blower 48 directs the air past or through the cooling coil 26. Heat in the air is absorbed by the refrigerant, and the now-conditioned air is routed to one or more rooms (not shown). Notably, the air handling system 22' need not include the heat exchanger 50 (or other heating device), and can instead simply include the fan/blower 48 as part of an air handling unit.

With the above designations in mind, the housing 38 of the ultraviolet air treatment system 20 is mounted to the supply duct 44 such that the ultraviolet lamp 34 extends within the duct 44. More particularly, the ultraviolet lamp 34 is positioned in close proximity to the cooling coil 26, either downstream or upstream thereof. In this way, ultraviolet energy generated by the ultraviolet lamp 34 interacts with the cooling coil 26, killing or irradiating microorganisms (e.g., bacteria, mold spores, etc) that are otherwise accumulating/growing on the cooling coil 26, as well as components proximate thereof, such as the supply duct 44, drip pans (not shown), etc.

In one preferred embodiment, the controller 32 (FIG. 1) automatically controls powering of the ultraviolet lamp 34 (via the activation device 36 (FIG. 1)) pursuant to the first control sequence. The first control sequence entails prompting the ultraviolet lamp 34 to a powered on condition for a first predetermined time period, and a powered off condition for a second predetermined time period. As previously described, the first and second predetermined time period values are stored in a memory of the controller 32. In a preferred embodiment, the first and second time periods are each in the range of 2–4 hours, most preferably 3 hours. Thus, in accordance with a most preferred embodiment, following installation, the controller 32 automatically and continuously cycles the ultraviolet lamp 34 (via prompting of the activation device 36) between a powered on condition for 3 hours and then a powered off condition for 3 hours. Alternatively, other time periods are acceptable, and the first and second predetermined time periods need not be identical.

The above methodology overcomes the inefficiencies associated with currently employed techniques whereby the ultraviolet lamp 34 is always powered on and/or a user is required to manually turn the ultraviolet lamp 34 off and on. To this end, it has surprisingly been found that immersing the cooling coil 26 in ultraviolet energy for 2–4 hours, more preferably 3 hours, is sufficient to destroy most microorganisms that might otherwise accumulate on the cooling coil 26 when done every 2–4 hours, more preferably every 3 hours. Further, and as a point of reference, a typical recommended lamp life associated with existing residential cooling coil ultraviolet treatment devices is approximately one year when the lamp is continuously powered on. In contrast, it has surprisingly been found that with the above-described system and method, whereby the ultraviolet lamp 34 is automatically cycled on for 3 hours and off for 3 hours, the useful life of the ultraviolet lamp 34 increases to two years.

In an alternative embodiment, the controller 32 (FIG. 1) is further adapted to monitor the operational mode of the air conditioner 24, and implement a second control sequence when certain parameters are satisfied. Pursuant to this embodiment, then, the controller 32 is further adapted to receive information from the air handling system 22 indicative of the operational mode of the air conditioner 24. Various techniques for delivering appropriate information to the controller 32 are provided below. Regardless, the controller 32 is adapted to interpret the signaled information and determine the operational mode of the air conditioner 24 on a preferably continuous basis, as well as to evaluate the operational mode during a transition routine (described below) for purposes of determining whether the ultraviolet lamp 24 is most appropriately operated in accordance with the first or second control sequence. In this regard, the controller 32 is adapted to store a predetermined length of time value that otherwise establishes a length of the transition routine, as well as a clock or similar timing device.

Figure 3:
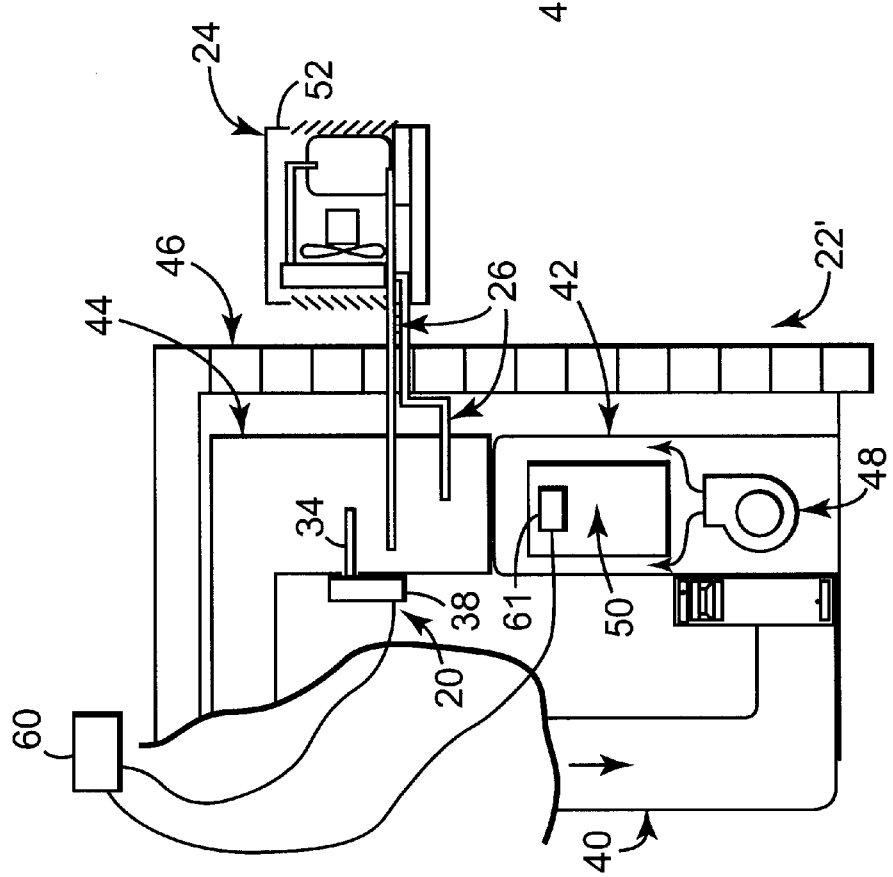
FIG. 3 is a diagrammatical illustration of an alternative application of the ultraviolet air treatment system in accordance with the present invention as applied to an air handling system including the air conditioner.

FIG. 3 illustrates one available technique for providing mode of operation information, including the ultraviolet air treatment device 20 in conjunction with the exemplary residential air handling system 22'. In addition, the air handling system 22' is shown as including an electronic environmental control unit 60 (shown in block form) that is electrically connected to a fan board 61 (that otherwise dictates operation of the air conditioner 24) and the ultraviolet air treatment system 20 (and in particular the controller 32 (FIG. 1)). The environmental control unit 60 can assume a wide variety of forms (e.g., a bussed control unit, thermostat, etc) that otherwise dictates activation/deactivation of the air conditioner 24. As such, the environmental control unit 60 can provide information indicative of whether the air conditioner 24 is operating in the cooling mode or the non-cooling mode. This information is signaled (e.g., bussed communication) to the controller 32, which then controls the ultraviolet lamp 34 accordingly, as described in greater detail below. It will be recognized that the environmental control unit 60 can be electrically connected to a component(s) (other than the fan board 61) that controls operation of the air condition 24.

Figure 4:
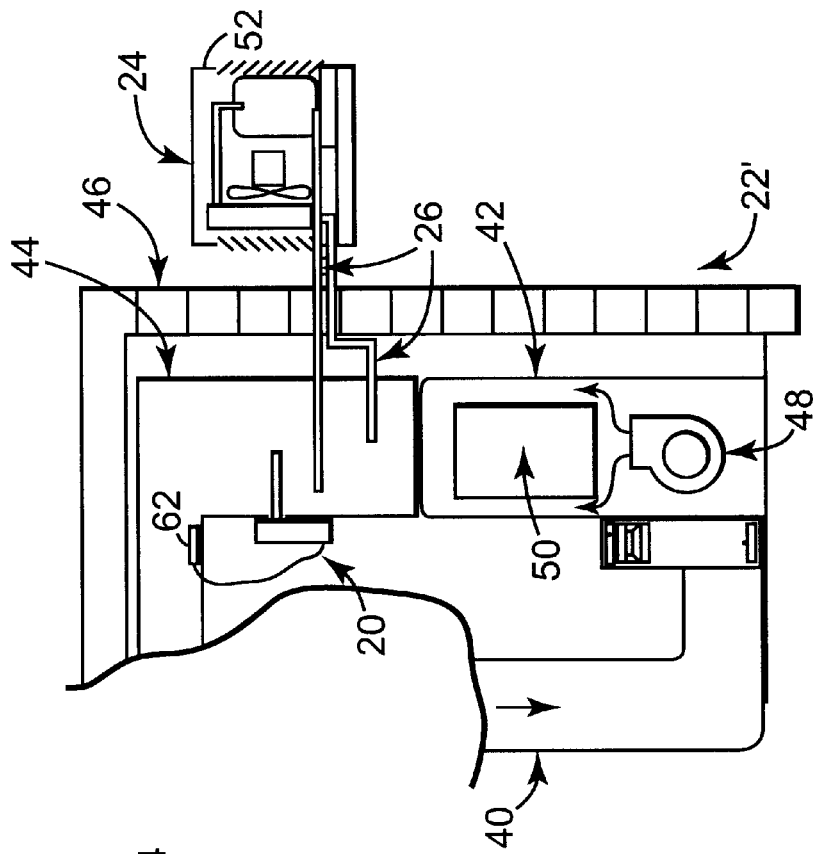
FIG. 4 is a diagrammatical illustration of yet another alternative ultraviolet air treatment system in accordance with the present invention and as applied to an air handling system including an air conditioner.

Alternatively, and with reference to FIG. 4, the ultraviolet air treatment system 20 can further include a sensor 62 located within the ductwork associated with the air handling system 22'. In one preferred embodiment, the sensor 62 is a temperature sensor as is known in the art, and is positioned within the supply duct 44 as shown. Alternatively, the sensor 62 can assume a variety of other forms, and can be positioned elsewhere within the air handling system 22'. Regardless, the sensor 62 provides information indicative of an operational mode of the air conditioner 24 and signals this information to the controller 32 (FIG. 1). For example, where the sensor 62 is a temperature sensor, a signal relating to a temperature within the air handling system 22 is provided to the controller 32. With this one preferred embodiment, and in general terms, a relatively high temperature is indicative of the air conditioner 24 being in a non-cooling mode, where as a relatively low temperature is indicative of the air conditioner 24 being in a cooling mode. In an even more preferred embodiment, the controller 32 not only monitors the sensed temperature, but also monitors or tracks a rate of change of the sensed temperature. In this manner, a rapid increase in temperature is more clearly indicative of a non-cooling mode of operation for the air conditioner 24 (e.g., a heating operation), whereas a relatively slow rise in temperature can indicate a cooling mode of operation (especially where the sensor 62 is located upstream of the cooling coil 26 or in a hot climate area such as an attic).

Figure 5:
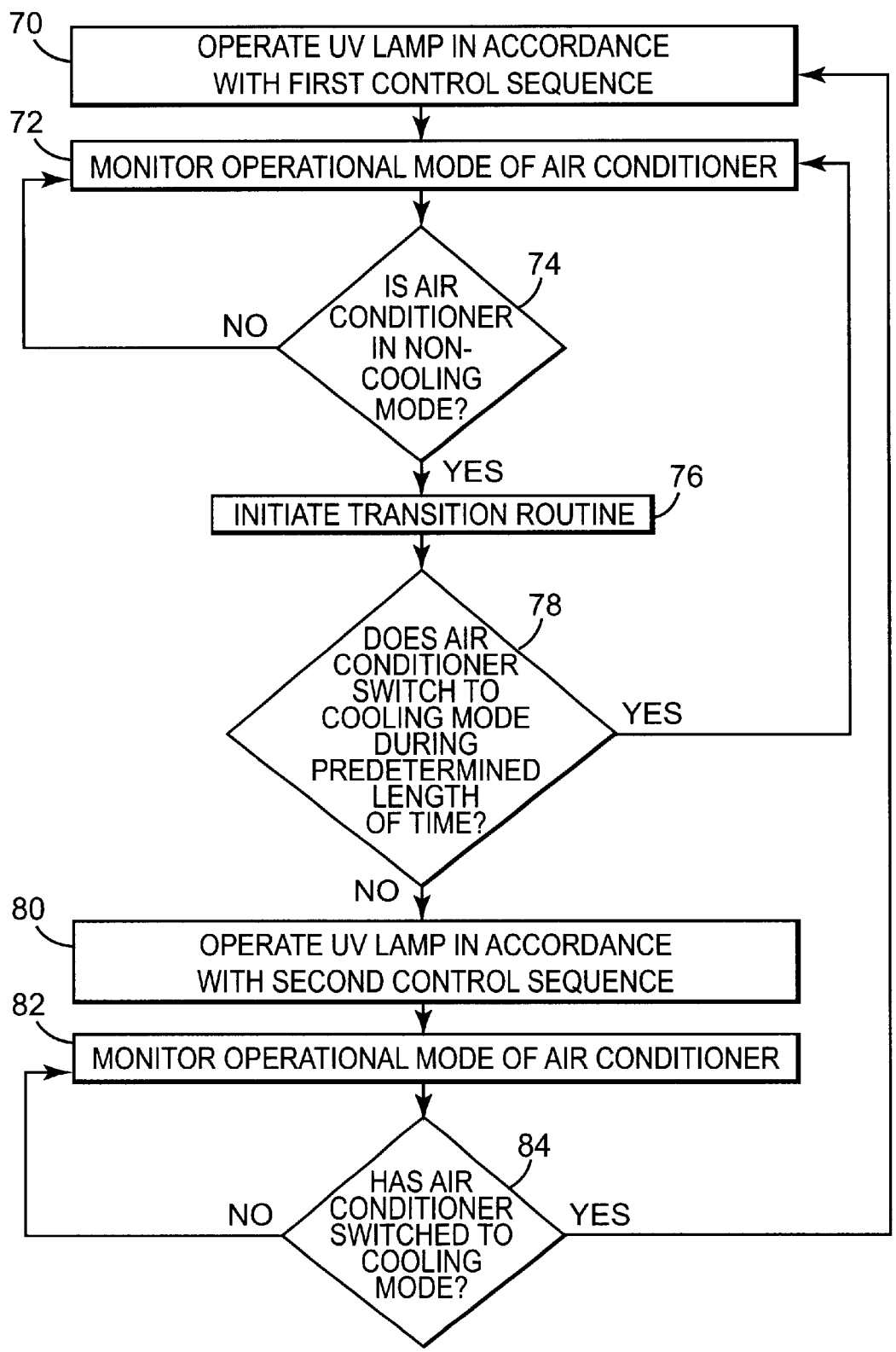
FIG. 5 is a flow diagram illustrating an alternative method of controlling an ultraviolet air treatment device in accordance with the present invention.

Regardless of whether the ultraviolet air treatment system 20 incorporates a discrete sensor or is directly connected to a component of the air handling system 22, an alternative method of controlling operational of the ultraviolet air treatment device 26 is illustrated by the flow diagram of FIG. 5. Following installation to the air handling system 22, the controller 32 automatically operates the ultraviolet lamp 34 in accordance with the first control sequence (via prompting of the activation device 36) at step 70. As previously described, the first control sequence entails cycling the ultraviolet lamp 34 between a powered on condition for a first predetermined time period and a powered off condition for a second predetermined time period.

At step 72, the controller 32 monitors the operational mode of the air conditioner 24. As previously described, a wide variety of techniques are available for providing/signaling the controller 32 with information indicative of the operational mode of the air conditioner 24. The controller 32 receives this information and, in conjunction with appropriate programming, interprets or determines the operational mode.

As the controller 32 monitors the operational mode of the air conditioner 24, a determination is made as to whether the air conditioner 24 is operating in a non-cooling mode at step 74. If the air conditioner 24 is not in the non-cooling mode ("no" at step 74), the control methodology returns to step 72 and continues monitoring the operational mode. Conversely, where a determination is made by the controller 32 that the air conditioner 24 has begun operating in a non-cooling mode ("yes" at step 74), the method proceeds to step 76 whereby a transition routine is initiated.

The transition routine entails the controller 32 continuing operation of the ultraviolet lamp(s) 34 in accordance with the first control sequence for a predetermined length of time while continually monitoring and confirming that the air conditioner 24 remains in a non-cooling mode. In other words, the controller 32 records the day and/or time at which the air conditioner 24 switches to the non-cooling mode of operation. The controller 32 then establishes a transition date and/or time as the date and/or time the transition routine was initiated plus the predetermined length of time value. Where the air conditioner 24 remains in the non-cooling mode through the transition date and/or time, the controller 32 assumes that the outdoor environment has changed (i.e., transitioned from summer season to winter season) and that future operation of the air conditioner 24 will not be required. In this regard, the predetermined length of time value is preferably in the range of 15–45 days, more preferably 30 days.

As indicated at step 78, as part of the transition routine, the controller 32 queries whether the air conditioner 24 has switched to the cooling mode of operation at any point during the predetermined length of time. If the mode of operation has transitioned back to cooling ("yes" at step 78), the transition routine is cancelled or exited, and the method routines to step 72, with the controller continuing to adhere to the first control sequence in controlling the ultraviolet lamp 34. Conversely, where the air conditioner 24 remains in the non-cooling operational mode for an entirety of the predetermined length of time ("no" at step 78), the method proceeds to step 80 whereby the controller 32 preferably implements a second control sequence for controlling activation/deactivation of the ultraviolet lamp 34.

The second control sequence is similar to the first control sequence in that the controller 32, via the activation device 36, cycles the ultraviolet lamp 34 between a powered on condition for a third predetermined time period and a powered off condition for a fourth predetermined time period. However, because the controller 32 has effectively determined that the air conditioner 24 will likely not be operated for a relatively lengthy period of time, the third and fourth predetermined time periods are more disparate. For example, the third predetermined time period is preferably in the range of 2–4 hours, more preferably 3 hours; whereas the fourth predetermined time period is preferably in the range of 20–22 hours, more preferably 21 hours. As such, pursuant to the second control sequence, the ultraviolet lamp 34 is less frequently powered on, conserving lamp usage and thus extending the overall useful life of the ultraviolet lamp 34.

While controlling the ultraviolet lamp 34 pursuant to the second control sequence, the controller 32 continues to monitor the operational mode of the air conditioner 24 at step 82. In this regard, the controller 32 periodically, preferably continuously, determines whether the air conditioner has switched to the cooling mode of operation at step 84. If a determination is made that the air conditioner 24 continues to operate in the non-cooling mode ("no" at step 84), the controller 32 adheres to the second control sequence and continues monitoring the operational mode at step 82. Conversely, where determination is made that the air conditioner 24 is now operating in a cooling mode ("yes" at step 84), the method returns to step 70, whereby the controller 32 reverts to the first control sequence and controls the operation of the ultraviolet lamp 34 accordingly.

The method associated with FIG. 5 further alleviates the inefficiencies associated with prior art techniques of constantly powering the ultraviolet lamp 34 on. Not only is the ultraviolet lamp 34 optimally cycled on and off during periods of air conditioner activity, but even less lamp life is consumed when the air conditioner 24 is not in use. It will be noted that the second control sequence essentially insures that even if the controller does not "sense" activation of the air conditioner 24 (and thus does not return to the first control sequence), the ultraviolet lamp 34 will still be turned on for at least a short period. In an alternative embodiment, however, where reliable operational mode information relating to the air conditioner 24 is constantly provided to the controller 32, the ultraviolet lamp 34 can simply be turned off following expiration of the transition period instead of implementing the second control sequence. For example, where the air handling system 22 includes a universal environmental control unit (e.g., 60 in FIG. 3) that is otherwise bussed to the controller 32, the controller 32 will always "know" whether the air conditioner 24 is operating or not. As such, following expiration of the transition period, the ultraviolet lamp 34 can safely be powered off without risk of unknown air conditioner reactivation. Because the controller 32 will always know when the air conditioner 24 is re-activated (via the universal environmental control unit), the controller 24 will immediately power on the ultraviolet lamp 34 in conjunction with the activation of the air conditioner 24. With this configuration, there is no risk that the controller 32 might not be informed of or otherwise "sense" the air conditioner 24 cycling on, and thus no need for the short term insurance provided by the second control sequence.

To further enhance an ability of the controller 32 to accurately estimate the long term mode of operation of the air conditioner 24, the controller 32 can be adapted to receive and process additional information relating to the air handling system 22. For example, when the air handling system 22 performs a heating operation, it can be surmised that the air conditioner 24 will likely not be used in the near future. Conversely, a relatively lengthy period of heat exchanger 50 (or other heating device) inactivity is an indication that the air conditioner 24 is being used, or will be used on a fairly regular basis. With this in mind, in an alternative embodiment, the controller 32 correlates or relies upon heating information to determine an expected mode of operation of the air conditioner 24, such as by designating the air conditioner 24 as being in the cooling mode (and thus controlling the ultraviolet lamp 34 in accordance with the first control sequence) when the air handling system 22 does not perform a heating operation for a predetermined length of time (e.g., 15 days).

In light of the above-described increase in useful lamp life, an additional feature preferably associated with the ultraviolet air treatment system of the present invention is an ability to determine when the ultraviolet lamp 34 is approaching an end of its useful life, and providing an indication of the status to a user. In this regard, the controller 32 is preferably programmed to store a maximum run time value and/or a maximum cycle value (or some other lamp replacement-related maximum value). Further, the controller 32 records and accumulates actual running or activation time and/or a total number of cycles for the ultraviolet lamp 34. When the actual, cumulative running time approaches the maximum run time value (e.g., within 10%) and/or the cumulative cycles approach the maximum cycle value (e.g., within 10%), the controller 32 prompts a warning signal in which an indication is given to user that the ultraviolet lamp 34 should be replaced. For example, the controller 32 can prompt activation of a light, audible alarm, etc.

The system and method of the present invention provides a marked improvement over previous designs. By automatically cycling the ultraviolet lamp between a powered on condition and a powered off condition, the system and method alleviates the inefficiencies of current ultraviolet cooling coil irradiation devices that remain on at all times. Further, and in accordance with one preferred embodiment, the system and method of the present invention determines an operation mode of the air conditioner, and utilizes this information to control the ultraviolet lamp on an even more efficient basis.

Although the present invention has been described with reference to preferred embodiments, worker's skilled in the art will recognize that changes can be made in form and detail without departing from the spirit and scope of the present invention.

What is claimed is:

1. A method of controlling operation of an ultraviolet air treatment device including an ultraviolet lamp positioned to irradiate an air conditioner cooling coil associated with an air handling system, the method comprising:

electrically connecting a controller to the ultraviolet air treatment device such that the controller can effectuate activation and deactivation of the ultraviolet lamp; and performing a first control sequence in which the ultraviolet lamp is automatically, repeatedly cycled between a powered on condition for a first predetermined time period and a powered off condition for a second predetermined time period via the controller;

wherein the ultraviolet lamp irradiates the cooling coil in the powered on condition.

2. The method of claim 1, wherein the first and second predetermined time periods are identical.

3. The method of claim 1, wherein the first and second predetermined time periods are each in the range of 2–4 hours.

4. The method of claim 3, wherein the first and second predetermined time periods are 3 hours.

5. The method of claim 1, wherein the air conditioner operates in either a cooling mode or a non-cooling mode, the method further comprising:

monitoring the operational mode of the air conditioner; and initiating a transition routine upon determining that the operational mode has switched from cooling to non-cooling, the transition routine including controlling operation of the ultraviolet lamp in accordance with the first control sequence for a predetermined length of time.

6. The method of claim 5, wherein the predetermined length of time is in the range of 15–45 days.

7. The method of claim 6, wherein the predetermined length of time is 30 days.

8. The method of claim 5, further comprising:

cancelling the transition routine upon determining that the operational mode has switched from non-cooling to cooling prior to expiration of the predetermined length of time; and controlling operation of the ultraviolet lamp in accordance with the first control sequence after the step of cancelling the transition routine.

9. The method of claim 5, further comprising:

performing a second control sequence upon completion of the transition routine in which the operational mode remains non-cooling for an entirety of the predetermined length of time;

wherein the second control sequence includes automatically cycling the ultraviolet lamp between a powered on condition for a third predetermined time period and a powered off condition for a fourth predetermined time period.

10. The method of claim 9, wherein the third predetermined time period is 2–4 hours and the fourth predetermined time period is 20–22 hours.

11. The method of claim 10, wherein the third predetermined time period is 3 hours and the fourth predetermined time period is 21 hours.

12. The method of claim 9, wherein after the step of performing a second control sequence, the method further comprises:

a. determining that the operational mode has switched from non-cooling to cooling; and b. performing the first control sequence.

13. The method of claim 5, wherein determining the operational mode includes:

receiving information from a control unit otherwise adapted to control operation of the air conditioner.

14. The method of claim 5, wherein the air handling system further includes a heating device, and further wherein determining an operational mode includes:

receiving information indicative of an operational state of the heating device.

15. The method of claim 14, wherein determining the operational mode further includes:
establishing the operational mode of the air conditioner as being cooling when the heating device remains in an off state for a predetermined number of days.

16. The method of claim 5, wherein determining the operation mode includes:
receiving temperature data from the air handling system; and
recording a rate of change of the temperature data.

17. The method of claim 1, further comprising:
storing a lamp replacement value;
accumulating data during activation of the ultraviolet lamp, the data being related to the lamp replacement value; and
providing a warning signal when the accumulated data approaches the lamp replacement value.

18. A control system for controlling operation of an ultraviolet air treatment device including an ultraviolet lamp positioned to irradiate an air conditioner cooling coil associated with an air handling system, the control system comprising:
an activation device electrically connected to the ultraviolet lamp for selectively powering the ultraviolet lamp on and off; and
a controller electrically connected to the activation device and adapted to:
store first and second predetermined time periods,
perform a first control sequence in which the controller automatically, repeatedly cycles the ultraviolet lamp between a powered on condition for the first predetermined time period and a powered off condition for the second predetermined time period.

19. The control system of claim 18, wherein the first and second predetermined time periods are each in the range of 2–4 hours.

20. The control system of claim 19, wherein the first and second predetermined time periods are 3 hours.

21. The control system of claim 18, wherein the air conditioner operates in either a cooling mode or a non-cooling mode, the controller further adapted to:
determine an operational mode of the air conditioner;
store a predetermined length of time value;
initiate a transition routine upon determining that the operational mode has switched from cooling to non-cooling, the transition routine including the controller controlling operation of the ultraviolet lamp in accordance with the first control sequence for the predetermined length of time.

22. The control system of claim 19, wherein the predetermined length of time is 15–45 days.

23. The control system of claim 22, wherein the predetermined length of time is 30 days.

24. The control system of claim 21, wherein the controller is further adapted to:
cancel the transition routine upon determining that the operational mode has switched from non-cooling to cooling prior to expiration of the predetermined length of time; and
control operation of the ultraviolet lamp in accordance with the first control sequence after cancelling the transition routine.

25. The control system of claim 21, wherein the controller is further adapted to:
perform a second control sequence upon completion of the transition routine in which the operational mode remains non-cooling for an entirety of the predetermined length of time;
wherein the second control sequence includes automatically cycling the ultraviolet lamp between a powered on condition for a third predetermined time period and powered off condition for a fourth predetermined time period.

26. The control system of claim 25, wherein the third predetermined time period is in the range of 2–4 hours and the fourth predetermined time period is in the range of 20–22 hours.

27. The control system of claim 21, wherein the controller is further adapted to:
receive information from a control unit indicative of the operational mode of the air conditioner, the control unit otherwise controlling operation of the air conditioner.

28. The control system of claim 21, wherein the air handling system further includes a heating device, the control system further comprising:
a temperature sensor electrically connected to the controller, the temperature sensor being positionable within the air handling system for providing temperature information indicative of an operational state of the heating device;
wherein the controller is further adapted to determine the operational state of the air conditioner based upon the temperature information.

29. The control system of claim 28, wherein the controller is further adapted to:
establish the operational mode of the air condition as being cooling when the heating device remains in an off state for a predetermined number of days.

* * * * *